US012743533B2

(12) United States Patent
Iwaki

(10) Patent No.: US 12,743,533 B2
(45) Date of Patent: Sep. 22, 2026

(54) OBJECT MANAGEMENT SYSTEM, OBJECT MANAGEMENT METHOD, AND OBJECT MANAGEMENT PROGRAM

(71) Applicant: DWANGO Co., Ltd., Tokyo (JP)

(72) Inventor: Shinnosuke Iwaki, Tokyo (JP)

(73) Assignee: Dwango Co., Ltd., Tokyo (JP)

( * ) Notice: Subject to any disclaimer, the term of this patent is extended or adjusted under 35 U.S.C. 154(b) by 234 days.

(21) Appl. No.: 17/762,646

(22) PCT Filed: Nov. 10, 2020

(86) PCT No.: PCT/JP2020/041974

§ 371 (c)(1),
(2) Date: Mar. 22, 2022

(87) PCT Pub. No.: WO2021/131363

PCT Pub. Date: Jul. 1, 2021

(65) Prior Publication Data

US 2022/0335145 A1 Oct. 20, 2022

(30) Foreign Application Priority Data

Dec. 25, 2019 (JP) ................................ 2019-234955

(51) Int. Cl.
*G06F 21/62* (2013.01)
*G06F 16/28* (2019.01)
*G06T 19/20* (2011.01)

(52) U.S. Cl.
CPC ........ *G06F 21/6218* (2013.01); *G06F 16/289* (2019.01); *G06T 19/20* (2013.01); *G06F 2221/2141* (2013.01)

(58) Field of Classification Search
CPC ............... G06F 21/6218; G06F 16/289; G06F 2221/2141; G06F 13/00; G06F 21/62; G06T 19/20; G06T 2219/2008
See application file for complete search history.

(56) References Cited

U.S. PATENT DOCUMENTS 11,392,662 B1 * 7/2022 Fregly ................ G06F 16/9566
11,586,784 B2 * 2/2023 Ha ....................... G06T 19/006
(Continued)

FOREIGN PATENT DOCUMENTS

CN 105264461 A 1/2016
JP 2011090640 A 5/2011
(Continued)

OTHER PUBLICATIONS

International Search Report and Written Opinion (English Translation only for ISR) mailed on Feb. 9, 2021 for International Patent Application No. PCT/JP2020/041974.

(Continued)

*Primary Examiner* — Alicia M Willoughby
(74) *Attorney, Agent, or Firm* — Dorsey & Whitney LLP

(57) ABSTRACT

An object management system according to one embodiment receives, from a user terminal, inquiry data indicating a combination of a target virtual object and a target parent object, refers to a database storing object relationship data indicating a hierarchical relationship between a plurality of objects, and allows the user terminal arrangement of the target virtual object in the virtual space when the combination indicated by the inquiry data is registered in the object relationship data, and disallows the arrangement of the user terminal when the combination is not registered in the object relationship data.

17 Claims, 11 Drawing Sheets

| ARRANGEMENT DATA OF VIRTUAL SPACE Sa | | | | |
|---|---|---|---|---|
| OBJECT ID | OBJECT ATTRIBUTE | | | |
| | PARENT OBJECT ID | NAME | POSITIONAL INFORMATION | ... |
| 0002 | 1001 | OBJECT A | ... | ... |
| 0003 | 1001 | OBJECT B | ... | ... |
| 0004 | 0003 | OBJECT C | ... | ... |

(56) References Cited

U.S. PATENT DOCUMENTS

2004/0078371 A1* 4/2004 Worrall ............... G06F 21/6218 707/999.009
2005/0131857 A1* 6/2005 Fujiki ..................... G06T 19/00
2014/0104320 A1* 4/2014 Davidson ............ G06F 3/04886 345/681
2015/0339497 A1* 11/2015 Kurian .................... G06F 21/60 726/34
2017/0228886 A1* 8/2017 Kashibuchi ........... G06T 19/006
2018/0315248 A1* 11/2018 Bastov .................. G06T 19/006
2022/0207199 A1* 6/2022 Ha .......................... G06T 19/20

FOREIGN PATENT DOCUMENTS

JP 2012118778 A 6/2012
JP 2019185720 A1 10/2019
WO 2010150768 A1 12/2010
WO 2021131363 7/2021

OTHER PUBLICATIONS

Rejection Decision for Chinese Patent Application No. 202080064926.0 dated Oct. 11, 2025, pp. all.
The First Office Action for Chinese Patent Application No. 202080064926.0, dated Mar. 10, 2025, pp. all.

* cited by examiner

Figure 1:
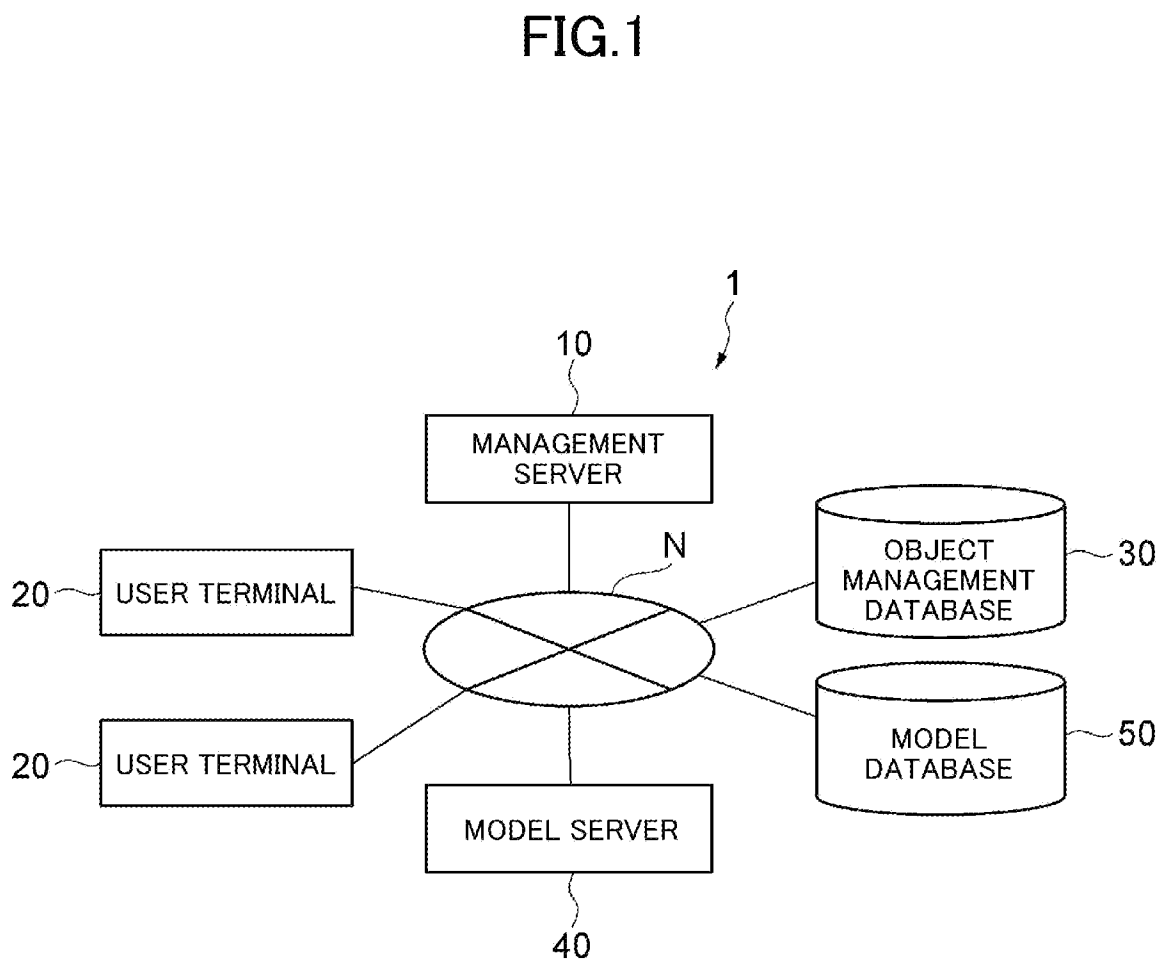

10 MANAGEMENT SERVER

N

40 MODEL SERVER

30 OBJECT MANAGEMENT DATABASE

50 MODEL DATABASE

20 USER TERMINAL

20 USER TERMINAL

FIG.2

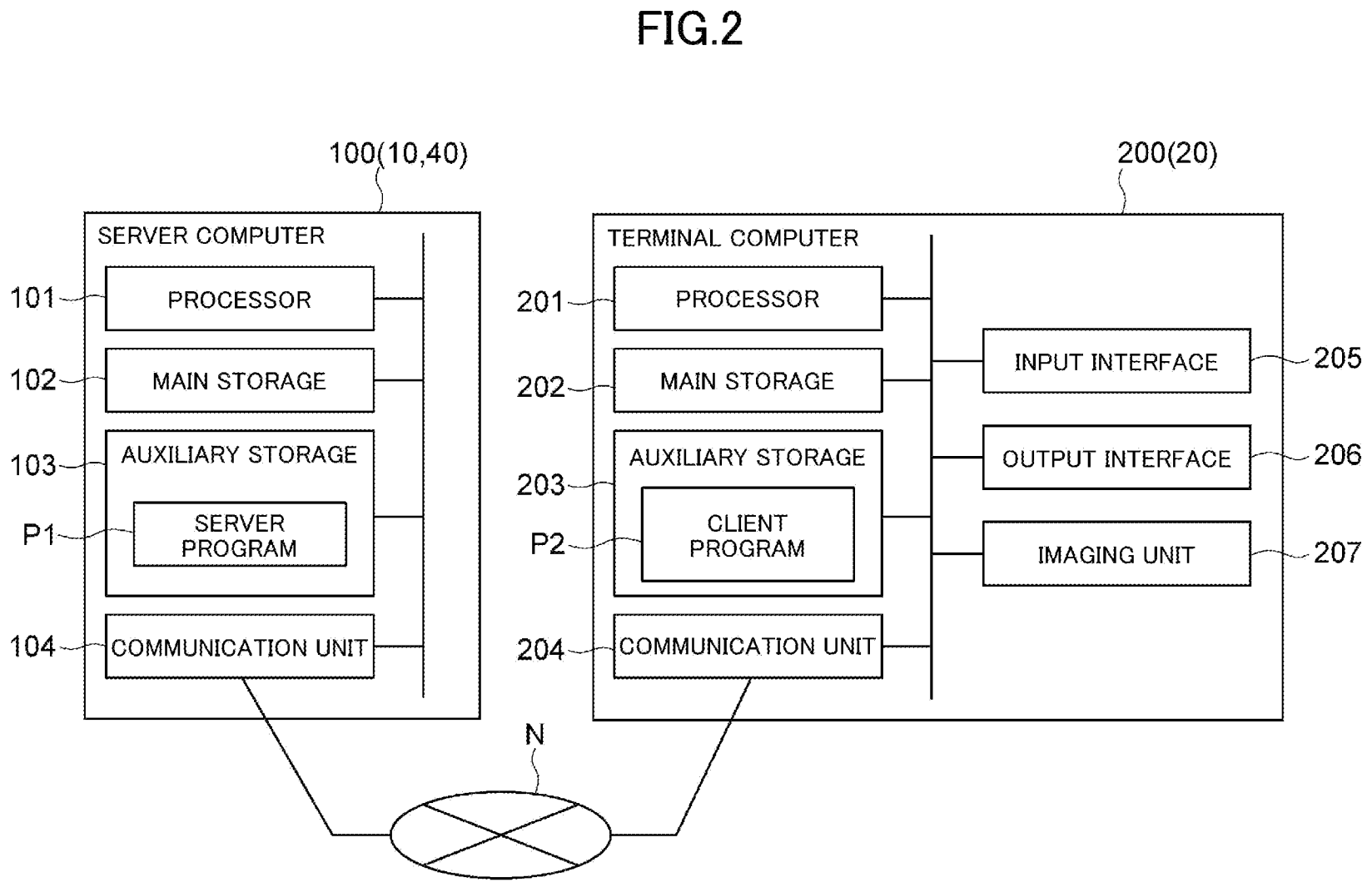

100(10,40)
SERVER COMPUTER
101 PROCESSOR
102 MAIN STORAGE
103 AUXILIARY STORAGE
P1 SERVER PROGRAM
104 COMMUNICATION UNIT

200(20)
TERMINAL COMPUTER
201 PROCESSOR
202 MAIN STORAGE
203 AUXILIARY STORAGE
P2 CLIENT PROGRAM
204 COMMUNICATION UNIT
205 INPUT INTERFACE
206 OUTPUT INTERFACE
207 IMAGING UNIT

Figure 3:
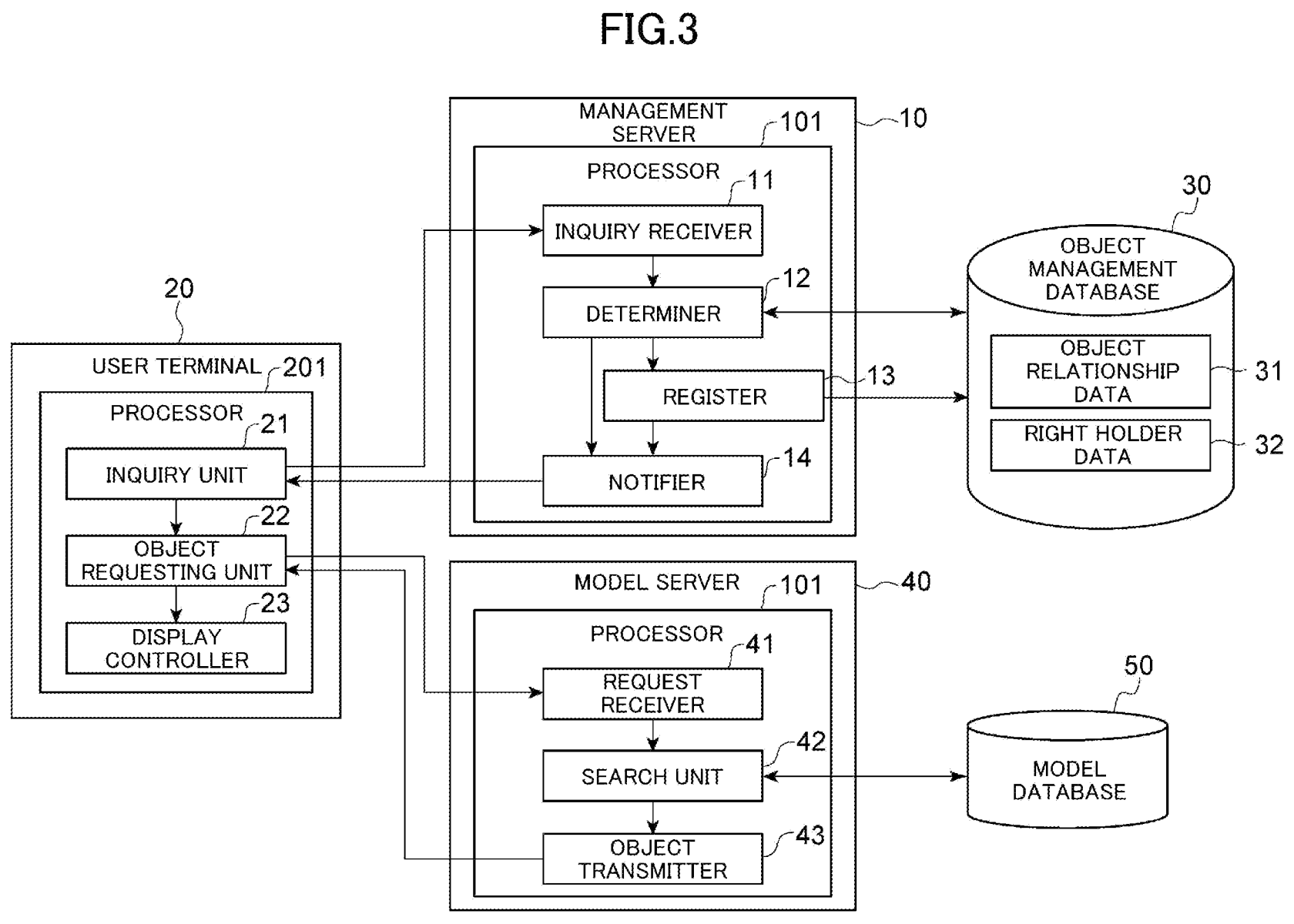

MANAGEMENT SERVER
10
PROCESSOR
101
INQUIRY RECEIVER
11
DETERMINER
12
REGISTER
13
NOTIFIER
14
OBJECT MANAGEMENT DATABASE
30
OBJECT RELATIONSHIP DATA
31
RIGHT HOLDER DATA
32
MODEL SERVER
40
PROCESSOR
101
REQUEST RECEIVER
41
SEARCH UNIT
42
OBJECT TRANSMITTER
43
MODEL DATABASE
50
USER TERMINAL
20
PROCESSOR
201
INQUIRY UNIT
21
OBJECT REQUESTING UNIT
22
DISPLAY CONTROLLER
23

| PARENT OBJECT ID | CHILD OBJECT ID |
|---|---|
| 1001 | 0002 |
| 1001 | 0003 |
| 0003 | 0004 |
| ... | ... |
| 9001 | 0011 |
| ... | ... |

32

| RIGHT HOLDER ID | OBJECT ID |
|---|---|
| USER Ua | 0002 |
| USER Ua | 0003 |
| USER Ua | 0004 |
| USER Ua | 0005 |
| ... | ... |
| USER Ub | 0011 |
| ... | ... |

ARRANGEMENT DATA OF VIRTUAL SPACE Sa

| OBJECT ID | OBJECT ATTRIBUTE | | | |
|---|---|---|---|---|
| | PARENT OBJECT ID | NAME | POSITIONAL INFORMATION | ... |
| 0002 | 1001 | OBJECT A | ... | ... |
| 0003 | 1001 | OBJECT B | ... | ... |
| 0004 | 0003 | OBJECT C | ... | ... |

| ARRANGEMENT DATA OF VIRTUAL SPACE Sb | | | | |
|---|---|---|---|---|
| OBJECT ID | OBJECT ATTRIBUTE | | | |
| | PARENT OBJECT ID | NAME | POSITIONAL INFORMATION | ... |
| 0002 | 9001 | OBJECT A | ... | ... |
| 0011 | 9001 | OBJECT E | ... | ... |

Figure 9:
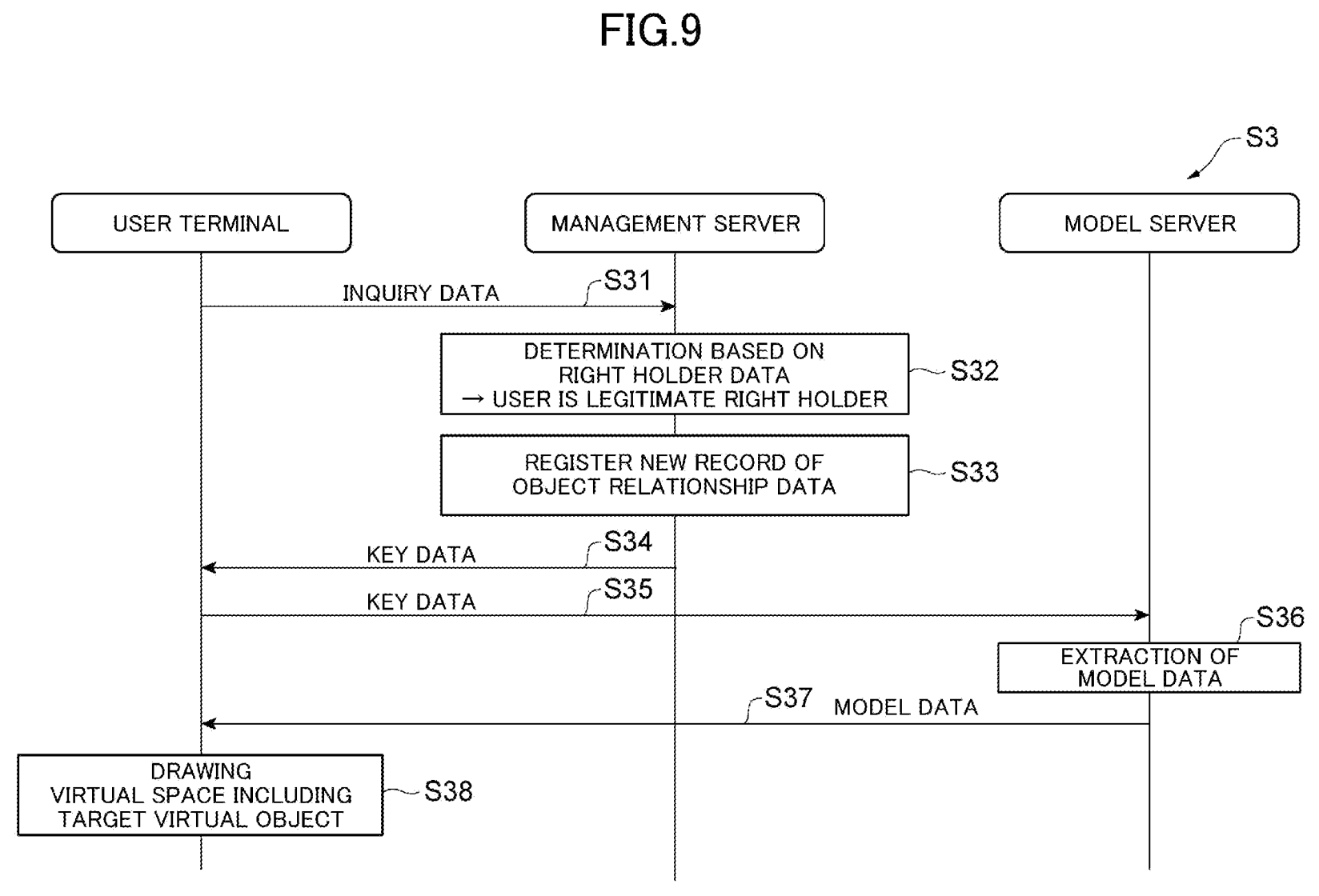

USER TERMINAL

MANAGEMENT SERVER

MODEL SERVER

S31 INQUIRY DATA

S32 DETERMINATION BASED ON RIGHT HOLDER DATA
→ USER IS LEGITIMATE RIGHT HOLDER

S33 REGISTER NEW RECORD OF OBJECT RELATIONSHIP DATA

S34 KEY DATA

S35 KEY DATA

S36 EXTRACTION OF MODEL DATA

S37 MODEL DATA

S38 DRAWING VIRTUAL SPACE INCLUDING TARGET VIRTUAL OBJECT

| ARRANGEMENT DATA OF VIRTUAL SPACE Sa | | | | |
|---|---|---|---|---|
| OBJECT ID | OBJECT ATTRIBUTE | | | |
| | PARENT OBJECT ID | NAME | POSITIONAL INFORMATION | ... |
| 0002 | 1001 | OBJECT A | ... | ... |
| 0003 | 1001 | OBJECT B | ... | ... |
| 0004 | 0003 | OBJECT C | ... | ... |
| 0005 | 0002 | OBJECT D | ... | ... |

OBJECT MANAGEMENT SYSTEM, OBJECT MANAGEMENT METHOD, AND OBJECT MANAGEMENT PROGRAM

CROSS REFERENCE TO RELATED APPLICATION(S)

This application is a U.S. National Stage filing under 35 U.S.C. § 371 of PCT Application No. PCT/JP2020/041974, filed Nov. 10, 2020, which claims priority to Japanese Application No. 2019-234955, filed Dec. 25, 2019, which are incorporated herein by reference, in their entirety, for any purpose.

TECHNICAL FIELD

An aspect of the present disclosure relates to an object management system, an object management method, and an object management program.

BACKGROUND ART

A system for managing accesses to content is known. For example, Patent Document 1 describes a content data management device that manages content data accessed by a user terminal. Such a content data management device determines whether or not a user of the user terminal having transmitted a request to access content data can access the content data, based on a user ID of the user, a content ID of the content data, and access permission information. When the access is allowed, the content data management device transmits the content data to the user terminal. When the access is denied, the content data management device transmits, to the user terminal, a screen for registration to access permission information, receives an access permission registration request from the user terminal, and stores the user ID in the access permission information in association with the content ID.

CITATION LIST

Patent Document

PATENT DOCUMENT 1: Japanese Unexamined Patent Publication No. 2012-118778

SUMMARY OF THE INVENTION

Technical Problem

There is a demand for appropriate management of accesses to virtual objects that can be arranged in a virtual space.

Solution to the Problem

An object management system according to an aspect of the present disclosure includes at least one processor. The at least one processor is configured to: receive, from a user terminal, inquiry data indicating a combination of a target virtual object and a target parent object; refer to a database storing object relationship data indicating a hierarchical relationship between a plurality of objects; and allow the user terminal arrangement of the target virtual object in the virtual space when the combination indicated by the inquiry data is registered in the object relationship data, and disallow the arrangement of the user terminal when the combination is not registered in the object relationship data.

An object management method according to one aspect of the present disclosure is executed by an object management system including at least one processor. The object management method includes: receiving, from a user terminal, inquiry data indicating a combination of a target virtual object and a target parent object; referring to a database storing object relationship data indicating a hierarchical relationship between a plurality of objects; and allowing the user terminal to arrange the target virtual object in the virtual space when the combination indicated by the inquiry data is registered in the object relationship data, and disallowing the arrangement of the user terminal when the combination is not registered in the object relationship data.

An object management program according to one aspect of the present disclosure is for causing a computer to: receive, from a user terminal, inquiry data indicating a combination of a target virtual object and a target parent object; refer to a database storing object relationship data indicating a hierarchical relationship between a plurality of objects; and allow the user terminal to arrange the target virtual object in the virtual space when the combination indicated by the inquiry data is registered in the object relationship data, and disallow the arrangement of the user terminal when the combination is not registered in the object relationship data.

In the above-described aspect, arrangement of the target virtual object in the virtual space is allowed when a combination of objects received from the user terminal (i.e., a combination of the target virtual object and the target parent object) is already registered as a hierarchical relationship. If the combination is not registered as a hierarchical relationship, the arrangement is disallowed. With a system that is not described in Patent Document 1, in which system, whether to allow a use of the virtual object is determined through verification of the hierarchical relationship between the objects, access to the virtual object that can be arranged in the virtual space can be suitably managed.

Advantages of the Invention

An aspect of the present disclosure allows appropriate management of accesses to virtual objects that can be arranged in a virtual space.

BRIEF DESCRIPTION OF THE DRAWINGS

FIG. 1 is a diagram illustrating an exemplary application of an object management system according to an embodiment.

FIG. 2 is a diagram illustrating an exemplary hardware configuration related to the object management system according to the embodiment.

FIG. 3 is a diagram illustrating an exemplary functional configuration related to the object management system according to the embodiment.

FIG. 4 is a diagram illustrating an exemplary data structure of the object management database.

FIG. 7 is a diagram showing an exemplary virtual space and exemplary arrangement data.

FIG. 8 is a diagram showing an exemplary virtual space and exemplary arrangement data.

FIG. 9 is a sequence diagram illustrating an exemplary operation of the object management system according to the embodiment.

FIG. 11 is a diagram showing an exemplary virtual space and exemplary arrangement data.

DESCRIPTION OF EMBODIMENT

Figure 5:
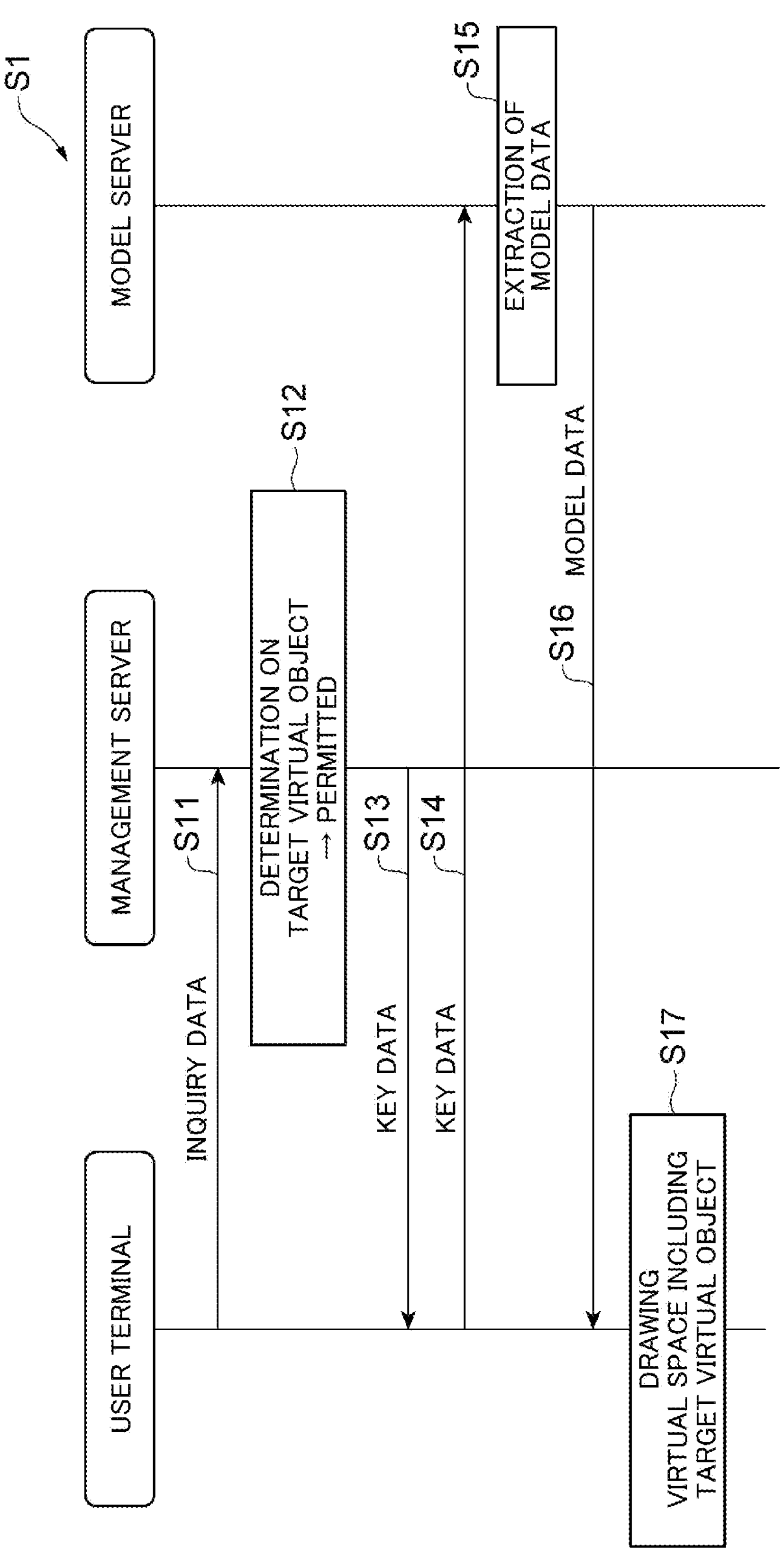
FIG. 5 is a sequence diagram illustrating an exemplary operation of the object management system according to the embodiment.

Hereinafter, an embodiment of the present disclosure will be described in detail with reference to the accompanying drawings. In the description of the drawings, the same or equivalent elements are denoted by the same reference numerals, and redundant description is omitted.

Overview of System

An object management system according to an embodiment is a computer system configured to manage access to virtual objects constituting content. Content refers to information in a human-recognizable form, which is provided by a computer or computer system. Electronic data indicating content is referred to as content data. No particular limitation is imposed on the form of expressing content and content may be expressed, for example, in the form of images (e.g., photographs, videos, etc.), documents, audio, music, or a combination of any two or more of these. No particular limitation is imposed on the purpose of content and on the scene of utilizing content, and content may be utilized for a variety of purposes such as, for example, entertainment, news, education, medical, gaming, chat, commerce, lecture, seminars, training, etc.

Further, in the present embodiment, the content is expressed by using at least an image. An image indicating content is referred to as "content image". The content image is an image from which a person can visually recognize some information. The content image may be a moving image (video) or a still image. The content image may be an image of the real world or virtual space. The virtual space is a virtual two-dimensional or three-dimensional space presented in the form of an image displayed on a computer. When a content image contains a virtual space, the content image is an image showing a landscape viewed from a virtual camera set in the virtual space. The virtual camera is set in the virtual space so as to match with the line of sight of the user viewing the content image. The virtual space is expressed with at least one virtual object. A virtual object refers to an object that does not actually exist in the real world and is presented only on a computer system. With a content image including a virtual space or a virtual object, a viewer may experience augmented reality (AR), virtual reality (VR), or mixed reality (MR).

The virtual object may be an avatar. An avatar is a computer-generated representation of a user him/herself. The avatar may be in the form of two-dimensional or three-dimensional computer graphics (CG) using an image material independent of an original image, instead of a photograph of a person him/herself. How the avatar is expressed is not limited. For example, the avatar may be in the form of an animation material, or may be an image as close to a real person based on a photographed image. The avatar may be freely selectable by a user of the object management system.

The virtual object, when arranged in the virtual space, serves as an element constituting content. The object management system manages access to the virtual object. The above expression reading "manages access to the virtual object" means to provide permission only to a user who has appropriate right to use the virtual object. Here, the user refers to a person who takes an action related to the content image, for example, a person who views or produces the content image. The object management system determines whether to allow a virtual object to be arranged in the virtual space constituting the content image displayed on a user terminal. If the arrangement is allowed, the user terminal can display the content image presenting the virtual space with the virtual object. If the arrangement is disallowed, the user terminal cannot use the virtual object, and therefore cannot display the virtual object.

In one example, the object management system functions at least partially as a platform to be used in an occasion of constructing a virtual space. In other words, the object management system can serve at least as a part of a virtual space development kit. For example, a provider who manages the object management system provides, to a user, a system for constructing a virtual space and virtual objects that can be arranged in the virtual space. The virtual objects may be provided by the provider or by a user. A user can access the object management system to construct a virtual space. The object management system may manage virtual objects created by the user, according to a request from the user.

In one example, the content is distributed to one or more viewers. Distribution refers to a process of transmitting information to a user via a communication network or broadcast network. Distribution, in the present disclosure, is a concept that encompasses broadcasting. A method of distributing content managed by a content management system is not particularly limited and may be, for example, real time distribution (internet live broadcasts), time-shifting, or on-demand.

A user who intends to produce, edit, or browse content (virtual space) obtains, through a proper procedure, a uniform resource locator (URL) to display the content on his/her user terminal. For example, a content creator or editor obtains, from a computer system, a URL for content which is provided when an empty virtual space is initially set. This URL may be made public with or without charge. A viewer of the content obtains the URL through a proper procedure, and is able to browse the content (virtual space) by accessing that URL.

On the other hand, there may be a person who tries to view the virtual space or obtain a virtual object through unauthorized access to the content (virtual space). In one example, the object management system manages access to virtual objects to inhibit unauthorized access and use of content.

In one example, the virtual object is downloaded to the user terminal and rendered to draw. If the virtual object is unlawfully obtained by any user, that virtual object may be unlawfully used or modified. In one example, the object management system enables smooth rendering of the virtual object at a user terminal while inhibiting such an unauthorized action.

System Configuration

FIG. 1 is a diagram illustrating an exemplary application of an object management system 1 according to an embodiment. In the present embodiment, the object management system 1 includes a management server 10. The management server 10 is a computer that manages access to virtual objects. In one example, the management server 10 is connected to at least one user terminal 20 and an object management database 30 via a communication network N. Each user terminal 20 can be connected to a model server 40 via the communication network N. The model server 40 is connected to a model database 50 via the communication network N. The number of user terminals 20 is not at all limited, although FIG. 1 illustrates two user terminals 20. The configuration of the communication network N is not limited. For example, the communication network N may be configured by including the internet, or configured by including an intranet.

Each user terminal 20 is a computer used by a user, and has a function of displaying a content image. In one example, the user terminal 20 inquires of the management server 10 whether the virtual object constituting the content image is usable. If use of the virtual object is allowed, the user terminal 20 can download the virtual object from the model server 40 and display the content image including the virtual object. If use of the virtual object is disallowed, the user terminal 20 cannot download the virtual object and therefore the user terminal 20 is not able to display the virtual object. The type and configuration of the user terminal 20 are not limited. For example, the user terminal 20 may be a mobile terminal such as a high-function mobile phone (smartphone), a tablet terminal, a wearable terminal (for example, a head-mounted display (HMD), smart glasses, or the like), a laptop personal computer, or a mobile phone. Alternatively, the user terminal 20 may be a stationary terminal such as a desktop personal computer.

The object management database 30 is a non-transitory storage device storing data needed for managing access to the virtual object. The model server 40 is a computer that provides model data of the virtual object to the user terminal 20. The model database 50 is a non-transitory storage device storing the model data. Positions of installing the object management database 30 and the model database 50 are not limited. For example, at least one of the object management database 30 or the model database 50 may be provided in a computer system separate from the object management system 1, or may be an element constituting the object management system 1. A position of installing the model server 40 is also not limited. For example, the model server 40 may be provided in a computer system separate from the object management system 1, or may be an element constituting the object management system 1.

FIG. 2 is a diagram illustrating an exemplary hardware configuration related to the object management system 1. FIG. 2 shows a server computer 100 serving as the management server 10 or the model server 40, and a terminal computer 200 serving as the user terminal 20.

For example, the server computer 100 includes a processor 101, a main storage 102, an auxiliary storage 103, and a communication unit 104 as hardware components.

The processor 101 is a computing device that executes an operating system and application programs. Examples of the processor include a central processing unit (CPU) and a graphics processing unit (GPU), but the type of the processor 101 is not limited to these. For example, the processor 101 may be a combination of sensors and a dedicated circuit. The dedicated circuit may be a programmable circuit such as a field-programmable gate array (FPGA) or another type of circuit.

The main storage 102 is a device that stores a program for achieving the management server 10 and computation results output from the processor 101, and the like. The main storage 102 is configured by, for example, at least one of a read-only memory (ROM) or random access memory (RAM).

The auxiliary storage 103 is generally a device capable of storing a larger amount of data than the main storage 102. The auxiliary storage 103 is configured by a non-volatile storage medium such as a hard disk or a flash memory. The auxiliary storage 103 stores a server program P1 that causes the server computer 100 to function as the management server 10 or the model server 40 and stores various pieces of data. For example, the auxiliary storage 103 may store data related to at least one of a virtual object such as a virtual object or a virtual space. In the present embodiment, an object management program is implemented as a server program P1.

The communication unit 104 is a device that executes data communication with another computer via the communication network N. The communication unit 104 is configured by, for example, a network card or a wireless communication module.

Each functional element the management server 10 or the model server 40 is achieved by having the processor 101 or the main storage 102 read the corresponding server program P1 and having the processor 101 execute the program. The server program P1 includes code for achieving each functional element of the management server 10 and the model server 40. The processor 101 operates the communication unit 104 according to the server program P1, and executes reading and writing of data from and to the main storage 102 or the auxiliary storage 103. Through such processing, each functional element of the management server 10 or the model server 40 is achieved.

At least one of the management server 10 or the model server 40 can be configured by one or more computers. In a case of using a plurality of computers, the computers are connected to each other via a communication network, so as to configure a logically single management server 10 or the model server 40.

As an example, the terminal computer 200 includes, as hardware components, a processor 201, a main storage 202, an auxiliary storage 203, a communication unit 204, an input interface 205, an output interface 206, and an imaging unit 207.

The processor 201 is a computing device that executes an operating system and application programs. The processor 201 may be, for example, a CPU or a GPU, but the type of the processor 201 is not limited to these.

The main storage 202 is a device that stores a program for achieving the user terminal 20, computation results output from the processor 201, and the like. The main storage 202 is configured by, for example, at least one of ROM or RAM.

The auxiliary storage 203 is generally a device capable of storing a larger amount of data than the main storage 202. The auxiliary storage 203 is configured by a non-volatile storage medium such as a hard disk or a flash memory. The auxiliary storage 203 stores a client program P2 for causing the terminal computer 200 to function as the user terminal 20, and various data. For example, the auxiliary storage 203 may store data related to at least one of a virtual object or a virtual space.

The communication unit 204 is a device that executes data communication with another computer via the communication network N. The communication unit 204 is configured by, for example, a network card or a wireless communication module.

The input interface 205 is a device that receives data based on a user's operation or action. For example, the input interface 205 includes at least one of a keyboard, an operation button, a pointing device, a microphone, a sensor, or a camera. The keyboard and the operation button may be displayed on the touch panel. The type of the input interface 205 is not limited, and neither is data input thereto. For example, the input interface 205 may receive data input or selected by a keyboard, an operation button, or a pointing device. Alternatively, the input interface 205 may receive audio data input through a microphone. Alternatively, the input interface 205 may receive image data (for example, video data or still image data) taken by a camera.

The output interface 206 is a device that outputs data processed by the terminal computer 200. For example, the output interface 206 is configured by at least one of a monitor, a touch panel, an HMD, or a speaker. A display device such as a monitor, a touch panel, or an HMD displays processed data on a screen. The speaker outputs a sound represented by the processed audio data.

The imaging unit 207 is a device that captures an image of the real world, and is a camera, specifically. The imaging unit 207 may capture a moving image (video) or a still image (photograph). In a case of capturing a moving image, the imaging unit 207 processes video signals based on a given frame rate so as to yield a time-sequential series of frame images as a moving image. The imaging unit 207 can also function as the input interface 205.

Each functional element the user terminal 20 is achieved by having the processor 201 or the main storage 202 read a client program P2 and having the processor 201 execute the program. The client program P2 includes code for achieving each functional element of the user terminal 20. The processor 201 operates the communication unit 204, the input interface 205, the output interface 206, or the imaging unit 207 in accordance with the client program P2 to read and write data from and to the main storage 202 or the auxiliary storage 203. Through this processing, each functional element of the user terminal 20 is achieved.

At least one of the server program P1 or the client program P2 may be provided after being non-temporarily recorded on a tangible recording medium such as a CD-ROM, a DVD-ROM, or a semiconductor memory. Alternatively, at least one of these programs may be provided via a communication network as a data signal superimposed on a carrier wave. These programs may be separately provided or may be provided together.

FIG. 3 is a diagram illustrating an exemplary functional configuration related to the object management system 1. Since a series of processes in the object management system 1 are executed due to a user operation, a functional configuration of the user terminal 20 will be first described. The user terminal 20 includes an inquiry unit 21, an object requesting unit 22, and a display controller 23 as functional elements. The inquiry unit 21 is a functional element in the user terminal 20, which is configured to inquire of the management server 10 whether the virtual object is usable. More specifically, the inquiry unit 21 inquires whether the virtual object can be arranged in the virtual space. In one example, the inquiry unit 21 may request the management server 10 to register object relationship data. The object requesting unit 22 is a functional element that requests model data of the virtual object from the model server 40 when the arrangement of the virtual object is allowed. The display controller 23 is a functional element that displays a content image indicating a virtual space on the display device. When the arrangement of the virtual object is allowed, the display controller 23 displays the virtual space including the virtual object.

The management server 10 includes an inquiry receiver 11, a determiner 12, a register 13, and a notifier 14 as functional elements. The inquiry receiver 11 is a functional element that receives, from the user terminal 20, an inquiry as to whether the virtual object is usable. The determiner 12 is a functional element that determines whether the virtual object is usable in the user terminal 20 (that is, whether the virtual object can be arranged in the virtual space in the user terminal 20). The register 13 is a functional element that registers data in the object management database 30. The notifier 14 is a functional element that transmits, to the user terminal 20, data based on a determination result as a response to the inquiry.

The object management database 30 stores object relationship data 31 indicating a hierarchical relationship among a plurality of objects and right holder data 32 indicative of a right holder of the virtual object arranged in the virtual space.

FIG. 4 is a diagram illustrating an exemplary data structure of the object management database 30. In this example, each record of the object relationship data 31 includes a parent object ID and a child object ID. These two types of IDs are each an identifier that uniquely specifies an object, and a hierarchical relationship between two objects is defined by a combination of these IDs. The hierarchical relationship indicates that the child object depends on the parent object, that is, the child object can exist only when the parent object exists. In one example, the parent object is the virtual space itself or a virtual object, and the child object is a virtual object. At least one of the parent object or the child object may be an avatar. For example, FIG. 4 shows a case where an object "0003" depends on object "1001" and object "0004" depends on object "0003".

The hierarchical relationship between the parent object and the child object indicated by the object relationship data 31 may indicate a physical positional relationship between both objects in the virtual space. For example, the child object may be a virtual object in contact with the parent object. As an example of the child object contacting the parent object, the child object may be a virtual object that is supported by the parent object. "The child object supported by the parent object" means that the position of the child object is maintained by the parent object against the gravity, supposing that the gravity acts in the virtual space as in real space. For example, the parent object may be a floor, and the child object may be a desk placed on the floor. Alternatively, the parent object may be a wall and the child object may be a painting hanging on the wall.

Each record of the right holder data 32 includes a right holder ID and an object ID. The right holder ID is an identifier that uniquely specifies the right holder of the virtual object. The right holder refers to a person who has legitimate right to use the virtual object, and may be, for example, a purchaser, creator, or owner of the virtual object. One user may hold rights for a plurality of virtual objects, and a plurality of users may hold rights for one type of virtual object. For example, FIG. 4 shows a case where a user Ua is a right holder of an object "0002", the object "0003", the object "0004", and an object "0005". In one example, a record of the right holder data 32 is registered in the object management database 30, in response to the user obtaining the virtual object through a proper method (e.g., purchasing, or given at free of charge, and the like). There is no limitation as to the computer to which the right holder data 32 is registered, and for example, such a computer may be the management server 10, the model server 40, or another computer or a computer system.

The model server 40 includes a request receiver 41, a search unit 42, and an object transmitter 43. The request receiver 41 is a functional element that receives a request for the model data from the user terminal 20. The search unit 42 is a functional element that extracts, from the model database 50, the model data corresponding to the request. The object transmitter 43 is a functional element that transmits, to the user terminal 20, the model data in response to the request.

The model data is electronic data used to define the specification of the virtual object. The model data of a virtual object is uniquely specified by the object ID of that virtual object. The specification of the virtual object refers to an arrangement or method for controlling the virtual object. For example, the specification includes at least one of a configuration (e.g., shape and dimension), a motion, or audio of the virtual object. For example, the model data may include information about a plurality of joints and a plurality of bones constituting the virtual object, graphic data indicating an exterior appearance design of the virtual object, and an attribute of the virtual object. Examples of the information on joints and bones include three-dimensional coordinates of individual joints and combinations of adjacent joints (i.e., bones). However, the configuration of this information is not limited to this and may be designed in any way. The attribute of the virtual object is any information that characterizes the virtual object and may include, for example, a nominal dimension, voice quality, performance, or a personality.

Operation of System

The following describes an operation of the object management system 1 (more specifically, an operation of the management server 10), and an object management method according to the present embodiment.

FIG. 5 is a sequence diagram showing an exemplary operation of the object management system 1 as a process flow S1. The process flow S1 indicates a case where arrangement of a virtual object in the virtual space is allowed. The process flow S1 may be executed before the user terminal 20 starts displaying the content image indicating the virtual space, or executed while the user terminal 20 displays the content image. In the present disclosure, the virtual object to be subjected to determination as to whether it can be arranged in the virtual space is also referred to as "target virtual object". The process flow S1 premises that the user terminal 20 has already obtained arrangement data indicating an arrangement of one or more virtual objects in the virtual space that is indicated by the content image intended to be displayed. For example, this arrangement data may be downloaded to the user terminal 20 in response to the user accessing the URL of the content. In one example, this arrangement data is electronic data indicating an attribute for each of one or more virtual objects, and the attribute includes information about the object ID of the parent object of the virtual object and information about the position of the virtual object in the virtual space.

In step S11, the inquiry unit 21 of the user terminal 20 transmits inquiry data to the management server 10. The inquiry unit 21 refers to the arrangement data to generate inquiry data containing a combination of the target virtual object and the parent object of that target virtual object (in the present disclosure, this is also referred to as "target parent object"). In one example, this inquiry data includes a combination of the object ID of the target virtual object (hereinafter, also referred to as "target virtual object ID") and the object ID of the target parent object (hereinafter, also referred to as "target parent object ID"). In the management server 10, the inquiry receiver 11 receives the inquiry data.

In step S12, the determiner 12 of the management server 10 determines whether to allow arrangement of the target virtual object in the virtual space. The determiner 12 refers to the object management database 30 and determines whether or not the object relationship data 31 includes a combination of the IDs indicated by the inquiry data. Specifically, the determiner 12 determines whether or not the object relationship data 31 includes a record in which the child object ID matches the target virtual object ID and the parent object ID matches the target parent object ID. When such a record exists, that is, when a combination of the target virtual object ID and the target parent object ID is registered in the object relationship data 31, the determiner 12 allows arrangement of the target virtual object in the virtual space. When the record does not exist, that is, when a combination of the target virtual object ID and the target parent object ID is not registered in the object relationship data 31, the determiner 12 disallows arrangement of the target virtual object in the virtual space. Verifying the hierarchical relationship between objects will be sufficient for the determiner 12 to determine whether to allow arrangement of the target virtual object, and the right holder of the target virtual object does not have to be confirmed. Therefore, the determiner 12 is able to determine whether to allow arrangement of the target virtual object, without confirming whether or not the user is a legitimate right holder of the target virtual object. In step S12, it is assumed that the determiner 12 allows arrangement of the target virtual object in the virtual space.

In step S13, the notifier 14 transmits key data to the user terminal 20. The key data is electronic data used for downloading the model data of the target virtual object to the user terminal 20. The data structure of the key data is not limited, and may be designed according to any given style. In one example, the key data may include a target virtual object ID. Alternatively, the key data may further include, in addition to the target virtual object ID, a one-time password that is valid only once. Such a one-time password may have an expiration date. In response to the permission to arrange of the target virtual object in the virtual space, the notifier 14 generates the key data for that target virtual object and transmits the key data to the user terminal 20. In the user terminal 20, the inquiry unit 21 receives the key data.

In step S14, the object requesting unit 22 of the user terminal 20 transmits the key data to the model server 40 to obtain the model data of the target virtual object. In the model server 40, the request receiver 41 receives the key data.

In step S15, the search unit 42 extracts the model data of the target virtual object from the model database 50. In one example, the search unit 42 extracts, from the model database 50, the model data corresponding to the target virtual object ID indicated by the key data. When the key data includes a one-time password, the search unit 42 extracts the model data corresponding to the target virtual object ID only if the one-time password is valid. The search unit 42 may determine that the one-time password is valid only when the one-time password is used for the first time or only when the one-time password is used for the first time within the validity period.

In step S16, the object transmitter 43 transmits the model data of the target virtual object to the user terminal 20. In the user terminal 20, the object requesting unit 22 receives the model data.

In step 517, the display controller 23 processes the model data to draw the virtual space including the target virtual object. The display controller 23 specifies the position of the target virtual object in the virtual space with reference to the arrangement data, and arranges the target virtual object at the position based on the model data. The display controller 23 draws the virtual space including the target virtual object by executing rendering based on data (virtual space data) indicating the virtual space and the model data.

Figure 6:
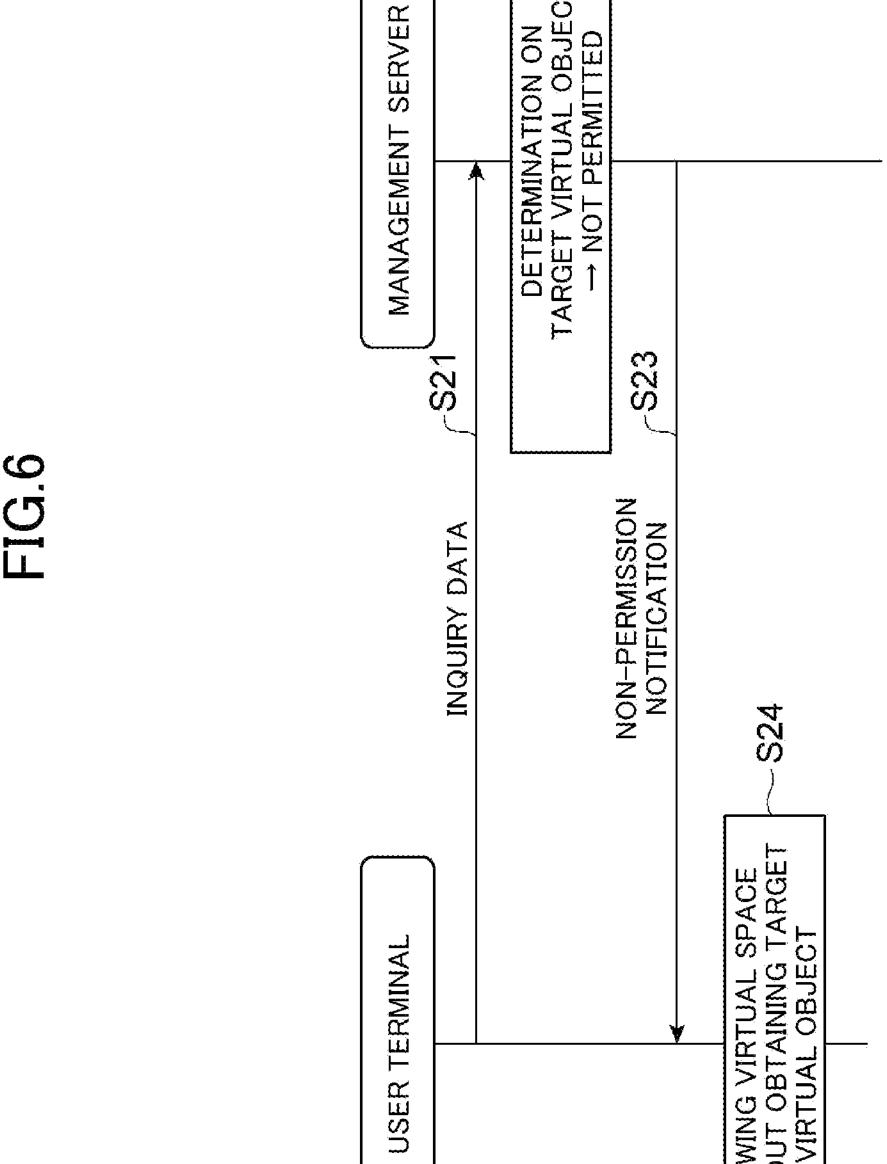
FIG. 6 is a sequence diagram illustrating an exemplary operation of the object management system according to the embodiment.

FIG. 6 is a sequence diagram showing another exemplary operation of the object management system 1 as a process flow S2. The process flow S2 indicates a case where arrangement of a virtual object in the virtual space is disallowed. The process flow S2 may be executed before the user terminal 20 starts displaying the content image indicating the virtual space, or executed while the user terminal 20 displays the content image. The process flow S2 premises that the user terminal 20 has already obtained arrangement data.

In step S21, the inquiry unit 21 of the user terminal 20 transmits inquiry data to the management server 10. This processing is similar to step S11.

In step S22, the determiner 12 of the management server 10 determines whether to allow arrangement of the target virtual object in the virtual space. This processing is similar to step S12. In step S22, it is assumed that the determiner 12 disallows arrangement of the target virtual object in the virtual space.

In step S23, the notifier 14 transmits a non-permission notification to the user terminal 20. The non-permission notification is electronic data for notifying the user terminal 20 that the model data of the target virtual object cannot be downloaded. The data structure of the non-permission notification is not limited, and may be designed according to any given style. In response to disallowing arrangement of the target virtual object in the virtual space, the notifier 14 generates the non-allowance notification and transmits the non-permission notification to the user terminal 20. In the user terminal 20, the inquiry unit 21 receives the non-permission notification.

In step S24, the display controller 23 draws the virtual space without obtaining the target virtual object, in response to the non-permission notification. Since the user terminal 20 does not obtain the key data for obtaining the model data, the step of requesting the model data to the model server 40 is not executed. The display controller 23 draws the virtual space by executing rendering based on the virtual space data, without using the model data of the target virtual object. The display controller 23 may display an error message indicating that the target virtual object cannot be drawn.

The inquiry for arranging the virtual object in the virtual space is executed for each of one or more virtual objects indicated by the arrangement data. The process flow S1 is executed if arrangement of the target virtual object is allowed, and the process flow S2 is executed if disallowed. As a result, the user terminal 20 may arrange and draw all of at least one virtual object indicated by the arrangement data, or arrange and draw a part of the at least one virtual object. Alternatively, the user terminal 20 may not be able to arrange and draw any virtual object indicated by the arrangement data.

With reference to FIGS. 7 and 8, the following describes an exemplary arrangement of the virtual objects in the virtual space. Both of FIGS. 7 and 8 are diagrams each showing one example of the virtual space and the arrangement data. The description of these examples premises that the object management database 30 stores the object relationship data 31 shown in FIG. 4.

Example (a) of FIG. 7 is a virtual space Sa including virtual objects A, B, and C. On the ground of the virtual space Sa, the virtual object A and the virtual object B are placed with a given interval therebetween, and the virtual object C is placed on the virtual object B. In other words, both the virtual objects A and B contact the lower surface of the virtual space, and the virtual object C contacts the virtual object B. The object IDs of the virtual space Sa, the virtual object A, the virtual object B, and the virtual object C are "1001", "0002", "0003", and "0004", respectively. Example (b) of FIG. 7 shows the arrangement data of the virtual space Sa. The arrangement data indicates that the parent objects of the virtual objects A and B are both the virtual space Sa, and the parent object of the virtual object C is the virtual object B. As in this example, the arrangement data may indicate the hierarchical relationship indicating a physical positional relationship between two objects in the virtual space, similarly to the object relationship data 31.

In the example of FIG. 7, it is supposed that the user having legitimately obtained the right to access the virtual space Sa uses the user terminal 20 to display thereon the virtual space Sa. The user may be a creator of the virtual space Sa or a person who is not involved in the creation (e.g., simply a viewer). In this case, the user terminal 20 inquires of the management server 10 about each of the virtual objects A, B, and C to be arranged in the virtual space Sa.

When inquiring about the virtual object A, the inquiry unit 21 transmits, to the management server 10, inquiry data containing a combination of the target virtual object ID "0002" and the target parent object ID "1001". Since this combination exists in the object relationship data 31, the determiner 12 of the management server 10 allows arrangement of the virtual object A in the virtual space Sa. In response to this permission, the notifier 14 transmits the key data for the virtual object A to the user terminal 20. In the user terminal 20, the object requesting unit 22 transmits that key data to the model server 40 to obtain the model data of the virtual object A, and the display controller 23 uses the model data to draw the virtual object A in the virtual space Sa.

When inquiring about the virtual object B, the inquiry unit 21 transmits, to the management server 10, inquiry data containing a combination of the target virtual object ID "0003" and the target parent object ID "1001". Since this combination is in the object relationship data 31, the determiner 12 of the management server 10 allows arrangement of the virtual object B in the virtual space Sa. In response to this permission, the object requesting unit 22 and the display controller 23 cooperate to draw the virtual object B in the virtual space Sa.

When inquiring about the virtual object C, the inquiry unit 21 transmits, to the management server 10, inquiry data containing a combination of the target virtual object ID "0004" and the target parent object ID "0003". Since this combination is in the object relationship data 31, the determiner 12 of the management server 10 allows arrangement of the virtual object C in the virtual space Sa. In response to this permission, the object requesting unit 22 and the display controller 23 cooperate to draw the virtual object C in the virtual space Sa.

As described above, the hierarchical relationship between two objects indicated by the arrangement data of the virtual space Sa is indicated by the object relationship data 31. Therefore, the user terminal 20 displays the virtual space Sa including the virtual objects A, B, and C.

Example (a) of FIG. 8 is a virtual space Sb including virtual objects A and E. On the ground of the virtual space Sb, the virtual object A and the virtual object E are placed with a given interval therebetween. In other words, both the virtual objects A and E contact the lower surface of the virtual space. The object IDs of the virtual space Sb, the virtual object A, and the virtual object E are "9001", "0002", and "0011", respectively. Example (b) of FIG. 8 shows the arrangement data of the virtual space Sb. The arrangement data indicates that the parent objects of the virtual objects A and E are both the virtual space Sb.

In the example of FIG. 8, it is supposed that the user having legitimately obtained the right to access the virtual space Sb uses the user terminal 20 to display thereon the virtual space Sb. In this case, the user terminal 20 inquires of the management server 10 about each of the virtual objects A and E to be arranged in the virtual space Sb.

When inquiring about the virtual object A, the inquiry unit 21 transmits, to the management server 10, inquiry data containing a combination of the target virtual object ID "0002" and the target parent object ID "9001". Since this combination is not in the object relationship data 31, the determiner 12 of the management server 10 disallows arrangement of the virtual object A in the virtual space Sb. Based on this determination, the notifier 14 transmits a non-permission notification to the user terminal 20. In the user terminal 20, the display controller 23 draws the virtual space Sb without obtaining the virtual object A, based on the non-permission notification.

When inquiring about the virtual object E, the inquiry unit 21 transmits, to the management server 10, inquiry data containing a combination of the target virtual object ID "0011" and the target parent object ID "9001". Since this combination exists in the object relationship data 31, the determiner 12 of the management server 10 allows arrangement of the virtual object E in the virtual space Sb. In response to this permission, the notifier 14 transmits the key data for the virtual object E to the user terminal 20. In the user terminal 20, the object requesting unit 22 transmits that key data to the model server 40 to obtain the model data of the virtual object E, and the display controller 23 uses the model data to draw the virtual object E in the virtual space Sb.

As described above, of the hierarchical relationship between two objects indicated by the arrangement data of the virtual space Sb, only a combination of the virtual object E and the virtual space Sb is indicated by the object relationship data 31. Therefore, the user terminal 20 displays the virtual space Sb including the virtual object E, but not including the virtual object A. This means that the user having the right to access the virtual space Sb has the right to use the virtual object E, but not the right to use the virtual object A. That is, this user is a person who accessed the virtual object A without authorization.

FIG. 9 is a sequence diagram showing yet another exemplary operation of the object management system 1 as a process flow S3. The process flow S3 indicates a case where arrangement of a new virtual object in the virtual space is allowed. The process flow S3 may be executed before the user terminal 20 starts displaying the content image indicating the virtual space, or executed while the user terminal 20 displays the content image. The process flow S3 premises that the user terminal 20 has already obtained arrangement data indicating an arrangement of one or more virtual objects in the virtual space that is indicated by the content image intended to be displayed.

In step S31, the inquiry unit 21 of the user terminal 20 transmits inquiry data to the management server 10. The user operates the user terminal 20 to perform an operation to arrange a new virtual object in the virtual space. In response to that operation, the user terminal 20 generates arrangement data related to that virtual object. The inquiry unit 21 processes the new virtual object as the target virtual object. Specifically, the inquiry unit 21 generates inquiry data containing a combination of the target virtual object (the new virtual object) and the parent object (target parent object) of that target virtual object. In one example, this inquiry data includes a combination of the target virtual object ID (the object ID of the new virtual object) and the target parent object ID, and further includes the user ID. In the management server 10, the inquiry receiver 11 receives the inquiry data.

In step S32, the determiner 12 of the management server 10 determines whether or not the user is a legitimate right holder of the target virtual object. The determiner 12 refers to the object management database 30 and determines whether or not a combination of the user ID and the target virtual object ID indicated by the inquiry data are registered in the right holder data 32. When the combination of the user ID and the target virtual object ID is registered in the right holder data 32, the determiner 12 determines that the user is a legitimate right holder of the target virtual object. When the combination is not registered in the right holder data 32, the determiner 12 determines that the user is not a legitimate right holder of the target virtual object. In step S32, it is assumed that the user is a legitimate right holder of the target virtual object.

In step S33, the register 13 registers a new record of the object relationship data 31. The register 13 sets the target virtual object ID and the target parent object ID as the child object ID and the parent object ID of the new record, respectively, and store that new record in the object management database 30. Registration of this new record means that the arrangement of the target virtual object in the virtual space is allowed.

In step S34, the notifier 14 transmits key data to the user terminal 20. In one example, the key data may include the object ID of the target virtual object. Alternatively, the key data may further include, in addition to the object ID, a one-time password that is valid only once. Such a one-time password may have an expiration date. In response to registration of the new record in the object relationship data 31 (i.e., permission of arrangement of the target virtual object in the virtual space), the notifier 14 generates the key data for that target virtual object and transmits the key data to the user terminal 20. In the user terminal 20, the inquiry unit 21 receives the key data.

In step S35, the object requesting unit 22 of the user terminal 20 transmits the key data to the model server 40 to obtain the model data of the target virtual object. In the model server 40, the request receiver 41 receives the key data.

In step S36, the search unit 42 extracts the model data of the target virtual object from the model database 50. In one example, the search unit 42 extracts, from the model database 50, the model data corresponding to the target virtual object ID indicated by the key data. When the key data includes a one-time password, the search unit 42 extracts the model data corresponding to the target virtual object ID only if the one-time password is valid. The search unit 42 may determine that the one-time password is valid only when the one-time password is used for the first time or only when the one-time password is used for the first time within the validity period.

In step S37, the object transmitter 43 transmits the model data of the target virtual object to the user terminal 20. In the user terminal 20, the object requesting unit 22 receives the model data.

In step S38, the display controller 23 processes the model data to draw the virtual space including the target virtual object. The display controller 23 specifies the position of the target virtual object in the virtual space with reference to the arrangement data, and arranges the target virtual object at the position based on the model data. The display controller 23 draws the virtual space including the target virtual object by executing rendering based on data (virtual space data) indicating the virtual space and the model data.

Figure 10:
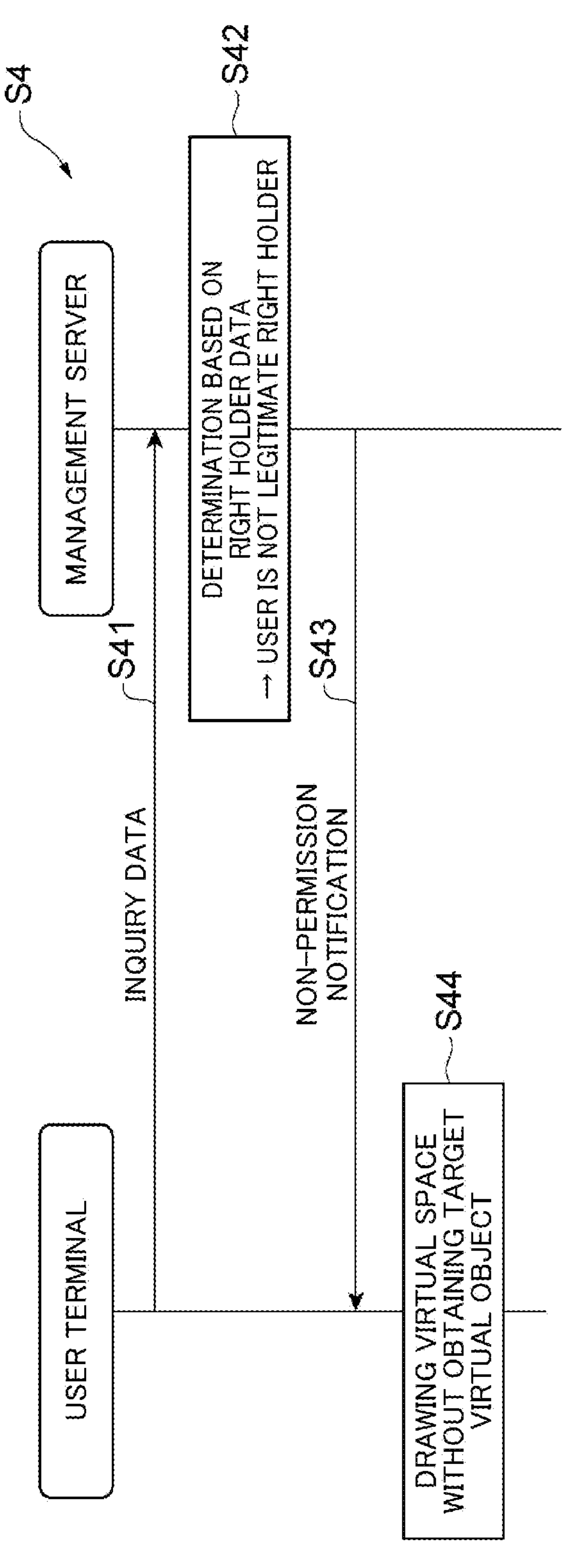
FIG. 10 is a sequence diagram illustrating an exemplary operation of the object management system according to the embodiment.

FIG. 10 is a sequence diagram showing yet another exemplary operation of the object management system 1 as a process flow S4. The process flow S4 indicates that the user is not a legitimate right holder of the target virtual object (i.e., arrangement of the target virtual object in the virtual space is disallowed). The process flow S4 may be executed before the user terminal 20 starts displaying the content image indicating the virtual space, or executed while the user terminal 20 displays the content image. The process flow S4 premises that the user terminal 20 has already obtained arrangement data.

In step S41, the inquiry unit 21 transmits the inquiry data to the management server 10, in response to a user operation to arrange the new virtual object in the virtual space. This processing is similar to step S31.

In step S42, the determiner 12 of the management server 10 determines whether or not the user is a legitimate right holder of the target virtual object. This processing is similar to step S32. In step S42, it is assumed that the user is not a legitimate right holder of the target virtual object. In this case, the register 13 does not register a new record of the object relationship data 31. Not registering a new record means that the arrangement of the target virtual object in the virtual space is disallowed.

In step S43, the notifier 14 transmits a non-permission notification to the user terminal 20. In response to determining that the user is not being a legitimate right holder of the target virtual object in the virtual space, the notifier 14 generates the non-permission notification and transmits the non-allowance notification to the user terminal 20. In the user terminal 20, the inquiry unit 21 receives the non-permission notification.

In step S44, the display controller 23 draws the virtual space without obtaining the target virtual object, in response to the non-permission notification. Since the user terminal 20 does not obtain the key data for obtaining the model data, the step of requesting the model data to the model server 40 is not executed. The display controller 23 draws the virtual space by executing rendering based on the virtual space data, without using the model data of the target virtual object. The display controller 23 may display an error message indicating that the target virtual object cannot be drawn.

The inquiry for arranging the new virtual object in the virtual space is executed for each new virtual object indicated by the arrangement data. When the user is a legitimate right holder of the new virtual object (i.e., arrangement of the target virtual object is allowed), the process flow S3 is executed. When the user is not a legitimate right holder of the new virtual object (i.e., arrangement of the target virtual object is disallowed), the process flow S4 is executed.

With reference to FIG. 11, the following describes an exemplary arrangement of a new virtual object in the virtual space. FIG. 11 is a diagram showing an exemplary virtual space and exemplary arrangement data. In the description of this example, it is assumed that the object management database 30 stores object relationship data 31 shown in FIG. 4.

Example (a) of FIG. 11 shows a case where a user Ua who is a creator of the virtual space Sa shown in Example (a) of FIG. 7 further arranges a new virtual object D. It is assumed that the user Ua arranges the virtual object D on the virtual object A. Thus, the virtual object D is in contact with the virtual object A. The object ID of the virtual object D is "0005". Example (b) of FIG. 11 shows arrangement data of the virtual space Sa, and more specifically shows a situation in which information related to the virtual object D is added to the arrangement data shown in Example (b) of FIG. 7. This additional information indicates that the parent object of the virtual object D is the virtual object A.

As described above with reference to FIG. 7, the user terminal 20 displays the virtual space Sa including the virtual objects A, B, and C. When the user Ua performs an operation to place the virtual object D on the virtual object A, the inquiry unit 21 transmits, to the management server 10, inquiry data including a combination of the target virtual object ID "0005" and the target parent object ID "0002", and the user ID "user Ua". Since the right holder data 32 includes the combination of the target virtual object ID "0005" and the user ID "user Ua", the determiner 12 of the management server 10 determines that the user Ua is a legitimate right holder of the virtual object D. In response to this determination, the determiner 12 stores a new record of the object relationship data 31 including the child object ID "0005" and the parent object ID "0002" in the object management database 30. Further, the notifier 14 transmits the key data for the virtual object D to the user terminal 20. In the user terminal 20, the object requesting unit 22 transmits that key data to the model server 40 to obtain the model data of the virtual object D, and the display controller 23 uses the model data to draw the virtual object D in the virtual space Sa. As a result, the user terminal 20 displays the virtual space Sa in which the virtual object D is further arranged.

Advantages

As described hereinabove, an object management system related to an aspect of the present disclosure includes at least one processor. The at least one processor is configured to: receive, from a user terminal, inquiry data indicating a combination of a target virtual object and a target parent object; refer to a database storing object relationship data indicating a hierarchical relationship between a plurality of objects; and allow the user terminal to arrange the target virtual object in the virtual space when the combination indicated by the inquiry data is registered in the object relationship data, and disallow the arrangement of the user terminal when the combination is not registered in the object relationship data.

An object management method according to one aspect of the present disclosure is executed by an object management system including at least one processor. The object management method includes: receiving, from a user terminal, inquiry data indicating a combination of a target virtual object and a target parent object; referring to a database storing object relationship data indicating a hierarchical relationship between a plurality of objects; and allowing the user terminal to arrange the target virtual object in the virtual space when the combination indicated by the inquiry data is registered in the object relationship data, and disallowing the arrangement of the user terminal when the combination is not registered in the object relationship data.

An object management program according to one aspect of the present disclosure is for causing a computer to: receive, from a user terminal, inquiry data indicating a combination of a target virtual object and a target parent object; refer to a database storing object relationship data indicating a hierarchical relationship between a plurality of objects; and allow the user terminal to arrange the target virtual object in the virtual space when the combination indicated by the inquiry data is registered in the object relationship data, and disallow the arrangement of the user terminal when the combination is not registered in the object relationship data.

In the above-described aspect, arrangement of the target virtual object in the virtual space is allowed when a combination of objects received from the user terminal (i.e., a combination of the target virtual object and the target parent object) is already registered as a hierarchical relationship. If the combination is not registered as a hierarchical relationship, the arrangement is disallowed. By determining whether to allow a use of the virtual object through verification of the hierarchical relationship between the objects, access to the virtual object that can be arranged in the virtual space can be suitably managed.

In the object management system according to another aspect, a hierarchical relationship between the plurality of objects may indicate a physical positional relationship between the plurality of objects in the virtual space. By defining the hierarchical relationship between objects as described above, arrangement of the virtual objects in the virtual space can be managed in a human-friendly manner (in other words, in a manner that allows a human to intuitively grasp the arrangement), based on the physical positional relationship.

In the object management system according to another aspect, the plurality of objects may include a parent object and a child object, and the physical positional relationship may be a contact of the child object with the parent object. By defining the hierarchical relationship between two objects contacting each other, as described above, arrangement of the virtual objects in the virtual space can be managed in a human-friendly manner (in other words, in a manner that allows a human to intuitively grasp the arrangement), based on the physical positional relationship.

In the object management system according to another aspect, the at least one processor may transmit, to the user terminal, key data for downloading the target virtual object to the user terminal when the arrangement is allowed. In this case, it is possible to more strictly manage access to the target virtual object, as compared to a case of immediately allowing download of the target virtual object.

In the object management system according to another aspect, the key data may include a one-time password. In this case, since reuse of the key data is avoided, it is possible to more strictly manage access to the target virtual object.

In the object management system according to another aspect, the at least one processor may be configured to: receive, from the user terminal, the inquiry data further including a user ID; refer to the database storing right holder data indicating a right holder of a virtual object; and when a combination of the target virtual object and the user ID indicated by the inquiry data is registered in the right holder data, register, in the database, a new record of the object relationship data indicating the combination indicated by the inquiry data and allow the user terminal to arrange the target virtual object in the virtual space. By registering new object relationship data only when the user is a legitimate right holder of the target virtual object, access to the virtual object that can be arranged in the virtual space can be suitably managed.

In the object management system according to another aspect, the target parent object may be one of the virtual space or the virtual object. With the target parent object defined as described above, it is possible to define the hierarchical relationship among all the virtual objects in the virtual space and suitably manage access thereto.

In the object management system according to another aspect, at least one of the target virtual object or the target parent object may be an avatar. In this case, access to at least one of the avatar or a virtual object directly related to the avatar can be suitably managed.

Variation

The present disclosure has been described above in detail based on the embodiment. However, the present disclosure is not limited to the embodiment described above. The present disclosure may be changed in various ways without departing from the spirit and scope thereof.

The overall configuration of the object management system is not limited. For example, logically one server may have the functions of both the management server 10 and the model server 40. The object relationship data 31 and the right holder data 32 may be stored in separate databases.

In the embodiment described above, the object management system 1 is configured using the management server 10. However, the object management system may be applied to direct distribution between user terminals without intervening a server. In this case, each functional element of the management server 10 may be implemented on any of the user terminals. Alternatively, each functional element of the management server 10 may be implemented separately on a plurality of user terminals. In this regard, the object management program may be implemented as a client program P2. The object management system may be configured using a server or may be configured without using a server.

The data structure of each set of data stored in the database is not limited, and may be designed according to any given style. At least one of the object relationship data, right holder data, and model data may be normalized or denormalized in any manner and stored on one or more data tables.

In the above-described embodiment, the management server 10 includes the register 13. However, the function of registering a new record of the object relationship data is not essential and may be omitted. In this regard, the database does not have to store the right holder data.

In the above-described embodiment, the management server 10 transmits the key data to the user terminal 20, and the user terminal 20 obtains the model data of the target virtual object from the model server 40 using the key data. However, it is possible to adopt a system of downloading the model data to the user terminal without using the key data. For example, when allowing arrangement of the target virtual object in the virtual space, the object management system may transmit the model data of the target virtual object stored in the model database to the user terminal in response to the inquiry data.

In the above-described embodiment, the object relationship data 31 indicates a hierarchical relationship between two objects, and the inquiry data indicates a combination of the target virtual object and the target parent object. That is, both the object relationship data 31 and the inquiry data indicate information about the pair of objects. However, the object relationship data may indicate a hierarchical relationship among three or more objects, and the inquiry data may indicate a combination of three or more objects.

In the present disclosure, the expression "at least one processor executes a first process, a second process, and . . . executes an n-th process." or the expression corresponding thereto is a concept including the case where the execution bodies (i.e., processors) of the n processes from the first process to the n-th process change in the middle. In other words, this expression is a concept including both a case where all of the n processes are executed by the same processor and a case where the processor changes during the n processes, according to any given policy.

In the present disclosure, the expression "transmitting" data or information from a first computer to a second computer means a transmission for final delivery of data or information to the second computer. Further, it should be noted that the expression encompasses a case where another computer or communication device relays data or information in the transmission.

The processing procedure of the method executed by the at least one processor is not limited to the example of the above embodiment. For example, a part of the above-described steps (processing) may be omitted, or each step may be executed in another order. Any two or more of the above-described steps may be combined, or some of the steps may be modified or deleted. Alternatively, other steps may be executed in addition to the steps described above.

DESCRIPTION OF REFERENCE CHARACTERS

1 Object Management System
10 Management Server
11 Inquiry Receiver
12 Determiner
13 Register
14 Notifier
20 User Terminal
21 Inquiry Unit
22 Object Requesting Unit
23 Display Controller
30 Object Management Database
31 Object Relationship Data
32 Right Holder Data
40 Model Server
41 Request Receiver
42 Search Unit
43 Object Transmitter
50 Model Database
P1 Server Program
P2 Client Program

The invention claimed is:

1. An object management system, comprising at least one processor configured to:

receive, from a user terminal via a communication network, inquiry data generated by the user terminal, the inquiry data including a first combination of an ID of a target virtual object and an ID of a target parent object of the target virtual object;

refer to a database storing object relationship data including a hierarchical relationship between a plurality of objects, the hierarchical relationship including a second combination of IDs of the plurality of objects and further including a physical positional relationship in a virtual space between the plurality of objects defined by the second combination of the IDs;

determine whether the first combination included in the received inquiry data matches the second combination included in the hierarchical relationship in the object relationship data stored in the database; and allow the user terminal arrangement of the target virtual object in the virtual space based on the physical positional relationship included in the hierarchical relationship in the object relationship data if the first combination matches the second combination, and disallow the user terminal the arrangement if the first combination does not match the second combination, wherein in response to the arrangement being allowed, the user terminal displays the virtual space including the target virtual object.

2. The object management system of claim 1, wherein the plurality of objects comprise a parent object and a child object, and wherein the physical positional relationship includes a contact of the child object with the parent object.

3. The object management system of claim 1, wherein the at least one processor is configured to transmit, to the user terminal, key data for downloading the target virtual object to the user terminal if the arrangement is allowed.

4. The object management system of claim 3, wherein the key data comprises a one-time password.

5. The object management system of claim 1, wherein the at least one processor is further configured to:

receive, from the user terminal, the inquiry data further including a user ID;

refer to the database further storing right holder data including a third combination of an ID of a right holder of a virtual object and an ID of the virtual object; and if a fourth combination of the ID of the target virtual object and the user ID included in the received inquiry data matches the third combination included in the right holder data, register, in the database, a new record of the object relationship data including the first combination and allow the user terminal to arrange the target virtual object in the virtual space.

6. The object management system of claim 1, wherein the target parent object is one of the virtual space or the virtual object.

7. The object management system of claim 1, wherein at least one of the target virtual object or the target parent object is an avatar.

8. An object management method executable in an object management system comprising at least one processor, the method comprising:

receiving, from a user terminal via a communication network, inquiry data generated by the user terminal, the inquiry data including a first combination of an ID of a target virtual object and an ID of a target parent object of the target virtual object;

referring to a database storing object relationship data including a hierarchical relationship between a plurality of objects, the hierarchical relationship including a second combination of IDs of the plurality of objects and further including a physical positional relationship in a virtual space between the plurality of objects defined by the second combination of the IDs;

determining whether the first combination included in the received inquiry data matches the second combination included in the hierarchical relationship in the object relationship data stored in the database; and allowing the user terminal arrangement of the target virtual object in the virtual space based on the physical positional relationship included in the hierarchical relationship in the object relationship data if the first combination matches the second combination, and disallowing the user terminal the arrangement if the first combination does not match the second combination, wherein in response to the arrangement being allowed, the user terminal displaying the virtual space including the target virtual object.

9. The object management method of claim 8, further comprising transmitting, to the user terminal, key data for downloading the target virtual object to the user terminal if the arrangement is allowed.

10. The object management method of claim 8, further comprising:

receiving, from the user terminal, the inquiry data further including a user ID;

referring to the database further storing right holder data including a third combination of an ID of a right holder of a virtual object and an ID of the virtual object; and if a fourth combination of the ID of the target virtual object and the user ID included in the received inquiry data matches the third combination included in the right holder data:

registering, in the database, a new record of the object relationship data including the first combination; and allowing the user terminal to arrange the target virtual object in the virtual space.

11. The object management method of claim 8, wherein the target parent object is one of the virtual space or the virtual object.

12. The object management method of claim 8, wherein at least one of the target virtual object or the target parent object is an avatar.

13. A non-transitory computer-readable medium comprising an object management program stored thereon, that when executed by a computer, causes the computer to:

receive, from a user terminal via a communication network, inquiry data generated by the user terminal, the inquiry data including a first combination of an ID of a target virtual object and an ID of a target parent object of the target virtual object;

refer to a database storing object relationship data including a hierarchical relationship between a plurality of objects, the hierarchical relationship including a second combination of IDs of the plurality of objects and further including a physical positional relationship in a virtual space between the plurality of objects defined by the second combination of the IDs;

determine whether the first combination included in the received inquiry data matches the second combination included in the hierarchical relationship in the object relationship data stored in the database; and allow the user terminal arrangement of the target virtual object in the virtual space based on the physical positional relationship included in the hierarchical relationship in the object relationship data if the first combination matches the second combination, and disallow the user terminal the arrangement if the first combination does not match the second combination, wherein in response to the arrangement being allowed, the user terminal displays the virtual space including the target virtual object.

14. The non-transitory computer-readable medium of claim 13, wherein the program, when executed by the computer, causes the computer to further perform transmitting, to the user terminal, key data for downloading the target virtual object to the user terminal if the arrangement is allowed.

15. The non-transitory computer-readable medium of claim 13, wherein the program, when executed by the computer, further causes the computer to:

receive, from the user terminal, the inquiry data further including a user ID;

refer to the database further storing right holder data including a third combination of an ID of a right holder of a virtual object and an ID of the virtual object; and if a fourth combination of the ID of the target virtual object and the user ID included in the received inquiry data matches the third combination included in the right holder data, register, in the database, a new record of the object relationship data including the first combination and allow the user terminal to arrange the target virtual object in the virtual space.

16. The non-transitory computer-readable medium of claim 13, wherein the target parent object is one of the virtual space or the virtual object.

17. The non-transitory computer-readable medium of claim 13, wherein at least one of the target virtual object or the target parent object is an avatar.

* * * * *